United States Patent [19]

Barbe' et al.

[11] Patent Number: 5,139,985
[45] Date of Patent: Aug. 18, 1992

[54] COMPONENTS AND CATALYST FOR THE POLYMERIZATION OLEFINS

[75] Inventors: Pier C. Barbe'; Luciano Noristi; Gianni Pennini, all of Ferrara; Enrico Albizzati, Arona, all of Italy

[73] Assignee: Himont Incorporated, Wilmington, Del.

[21] Appl. No.: 657,927

[22] Filed: Feb. 20, 1991

Related U.S. Application Data

[63] Continuation-in-part of Ser. No. 359,234, May 31, 1989, abandoned.

[30] Foreign Application Priority Data

May 31, 1988 [IT] Italy .................. 20811 A/88

[51] Int. Cl.$^5$ .............................................. C08F 4/654
[52] U.S. Cl. ...................................... 502/109; 502/118; 502/123; 502/125; 502/127; 502/134; 502/159; 526/125
[58] Field of Search ............... 502/109, 118, 123, 125, 502/127, 134, 159

[56] References Cited

U.S. PATENT DOCUMENTS

| | | | |
|---|---|---|---|
| 3,135,809 | 6/1964 | Bosmajian | 502/103 X |
| 4,021,599 | 5/1977 | Kochhar | 502/109 X |
| 4,098,979 | 7/1978 | Maemoto et al. | 502/109 X |
| 4,107,415 | 8/1978 | Giannini et al. | 502/109 X |
| 4,246,134 | 1/1981 | Uvarov et al. | 502/109 X |
| 4,292,198 | 9/1981 | Gerritsen et al. | 502/159 X |
| 4,477,639 | 10/1984 | Nielsen | 502/109 X |
| 4,522,930 | 6/1985 | Albizatti et al. | 502/123 X |
| 4,670,525 | 6/1987 | Loontjens et al. | 502/127 X |

FOREIGN PATENT DOCUMENTS

| | | | |
|---|---|---|---|
| 465819 | 6/1978 | U.S.S.R. | 502/109 |
| 2028347 | 8/1979 | United Kingdom . | |

OTHER PUBLICATIONS

S. A. Mkrtchyan, et al., "Formation and Growth of Polypropylene And Polyethylene Particles During The Polymerization Of Olefins On Deposited Catalysts", Polymer Science U.S.S.R., vol. 28, No. 10, pp. 2343–2350.

*Primary Examiner*—Patrick P. Garvin

[57] ABSTRACT

Catalyst components for the polymerization of olefins comprising a titanium or vanadium compound supported on a porous particulate polymeric support which particles have a porosity greater than 0.3 cc/g and a pore distribution such that at least 40% of the pores have radius greater than 150 Å.

The catalyst components are prepared by impregnating the polymeric support with a solution of the Ti or V compound and evaporating the solvent.

18 Claims, No Drawings

COMPONENTS AND CATALYST FOR THE POLYMERIZATION OLEFINS

This application is a continuation-in-part of U.S. patent application, Ser. No. 07/359,234, filed May 31, 1989 and now abandoned.

This invention concerns catalyst components for the polymerization of olefins supported on a porous polymeric medium, their method of preparation and their use in forming catalysts for the polymerization of olefins of formula $CH_2=CHR$ where R is hydrogen, an alkyl radical with 1-6 C atoms, or an aryl radical, or mixtures of such olefins with or without dienes.

There are known catalyst components for the polymerization of olefin containing a magnesium dihalide and a Ti compound supported on a porous medium containing inorganic oxides, such as silica, aluminia, magnesium oxide and others.

Such catalyst components are generally obtained impregnating the porous support medium with a solution of a magnesium compound capable of being transformed into magnesium halide or dihalide by reaction with a halogenating agent, evaporating then the solvent, and treating the solid thus obtained with a titanium compound.

The resulting catalysts are characterized by elevated activity (expressed in polymer grams per grams of catalyst component). The polymers that are obtained this way, however, do not present satisfactory morphologic properties: specifically, the bulk density does not reach satisfactory values.

In the patent literature the possibility of supporting the titanium and magnesium compounds on polymeric support mediums is mentioned. However, the support referred to is essentially non-porous, obtained, for example, by grinding polyethylene or polypropylene and similar polymers.

In the latest industrial production processes for polymerizing olefins there is a need for high performance catalysts, capable of producing polymers in the form of particles which have a controlled morphology and high bulk density.

Catalysts which are capable of producing good performance polymer in the form of flowing particles and high apparent density are known. Such catalysts are obtained by spraying, using spray-drying techniques, solutions of magnesium compounds capable of being transformed into magnesium dihalide, and subsequently reacting the solid spherical particles thus obtained with titanium tetrachloride.

According to other methods of impregnation, melted adducts of magnesium dichloride with alcohols are emulsified in inert solvents, operating under temperature conditions which cause solidification of the melted adduct particles.

All these methods present the inconvenience of being laborious and do not allow an adequate control of particle size distribution.

Now unexpectedly it has been found that it is possible to obtain catalysts, which are capable of producing polymers in the form of particles with controlled morphology and which have high bulk density, by supporting titanium or vanadium compounds on polymer particles having a porosity greater than 0.3 cc/g and a pore distribution such that at least 40% of the pores have radius greater than 150 Å. Preferably, the polymeric support has a porosity greater than 0.5 cc/g, in particular from 1 to 3 cc/g, and a distribution such that at least 70% of the pores have radius greater than 150 Å, in particular from 150 to 350 Å.

The surface area is generally from 30 to 1000 $m^2/g$ and preferably between 100 and 600 $m^2/g$. The polymeric support is preferably in the form of microspheroidal particles with a diameter of from 10 to 200 μm.

Any polymer which does not react with the catalytic components and/or the catalyst, and which can be obtained in particular form with the porosity and pore characteristics indicated above, may be used. It is preferable to use the partially crosslinked polymers used in the preparation of ion exchange resins. Such polymers are obtained by the copolymerization of 70 to 30 weight % of styrene monomers, such as styrene, ethylvinylbenzene, vinyltoluene, methylstyrene and mixtures thereof with from 30 to 70 weight %, preferably 40 to 60%, of crosslinkable monomers, such as divinylbenzene, divinyltoluene and mixtures thereof.

Methods of preparing the partially cross-linked copolymers are described in Polymer Science 5, 113–213 (1967), as well in the U.S. Pat. No. 4,224,415, whose description of such preparation method is incorporated herein by reference.

Preferred polymers are partially cross-linked styrenedivinylbenzene copolymers.

The preferred catalytic components include, as the Ti or V compound, a halide or haloalkoxide, as well as a magnesium halide.

An electron donor compound is also present whenever the components are used to form catalysts for the stereoregular polymerization of olefins having the formula $CH_2=CHR$, where R is an alkyl radical with 1-6 C atoms, or an aryl radical.

The preparation of catalyst components comprising a titanium compound and magnesium dihalide is carried out by suspending the polymeric support medium in a solution of a magnesium dihalide or a magnesium compound capable of being transformed into a magnesium dihalide, and subsequently evaporating the solvent.

The solid particles thus obtained are then submitted to known transformation reactions of the magnesium compounds, or of magnesium dihalide complexes into anhydrous magnesium dihalide.

Usable magnesium compounds include Mg-alkyls or dialkyls, alkoxides, carboxylates and magnesium carbonates which are soluble in aliphatic or aromatic hydrocarbons.

The magnesium dihalides are usually dissolved in alcohols, ethers, ketones, or esters. Aqueous solutions of the magnesium dihalides may also be used. The hydrated magnesium halides are then transformed into anhydrous halides through known reactions such as, for instance, treatment with $TiCl_4$.

The magnesium compound is used at such concentration as to have, in the finished catalyst component, a magnesium content greater than 1% by weight, and preferably between 2 and 10% by weight.

Generally, solutions containing quantities of magensium compound from 5 to 50% with respect to the polymeric support medium are used.

The operating temperature is generally from 0° C. to 150° C. Compounds or complexes of magnesium which are preferred are the following: $MgCl_2.2\ Ti(OC_4H_9)_4$, $MgCl_2.nROH$, $MgR_2$, $MgRCl$, $MgRBr$, $Mg(OR)_2$, $MgR(OR)$, $Mg(OR)Br$, $Mg(OR)Cl$, $Mg(OCOR)_2$ where R is an alkyl, cycloalkyl or aryl radical with 1-20 C atoms, and n is a number from 0.5 to 6.

As previously indicated, from the supports containing a magnesium compound transformable in anhydrous magnesium dihalide one can obtain the catalyst component of this invention through known reactions. Generally, when the magnesium compound present in the support is halogenated, it is treated with TiCl$_4$, or its solutions, in aliphatic or aromatic organic solvents, or in halogenated solvents, optionally in the presence of an electron-donor compound. In case of a nonhalogenated magnesium compound, the support is treated with a halogenating agent such as SiCl$_4$, chlorosilanes, HSiCl$_3$, Al-alkyl halides, and then, the magnesium dihalide obtained is reacted with a titanium or vanadium compound.

Reactions between adducts of magnesium dihalides and TiCl$_4$ are described in U.S. Pat. No. 4,294,721. The magnesium dihalide which is obtained with the above mentioned reactions is present in the active form and is characterized by an X-ray spectrum where the most intense diffraction line which appears in the non-activated dihalide is substituted by a halo with a maximum intensity shifted with respect to the position of the most intense line, or such a reflection shows a broadening.

The catalyst components thus obtained generally present porosity characteristics inferior to those of the initial support mediums. The lowest porosity limit is 0.2 cc/g, and the pore distribution is such that at least 30% of the pores has a radius greater than 150 Å. In the preferred components the porosity is greater than 1 cc/g, more particularly it is from 1 to 2 cc/g, and the radius of the pores is at least 40% greater than 150 Å.

The titanium or vanadium compound is present in the support in quantities generally from 1 to 10% by weight.

The electron-donor components that are useful in this invention are those containing, in their molecule, oxygen, sulfur, phosphorous or nitrogen atoms.

Particularly worth mentioning are esters of oxygenated acids, acids of halides, ketones, aldehydes, alcohols, ethers, thioethers, amides, lactones, phosphites, and phosphorous amides.

The esters are particularly chosen among the alkyl esters of mono and polycarboxylic armoatic acids. Examples of such esters are methyl, ethyl, butyl and octyl acetate, ethyl valerate, phenyl propionate, mono and diethyl succinate, ethyl, propyl and octyl benzoate, ethyl-p-toluate, ethyl-p-anisate, diisobutyl malonate, diethyl malonate, diisobutyl adipate, dioctyl sebacate; alkylmaleates, cycloalkyl and aryl maleates, alkyl and aryl pivalates, alkyl acrylates and methacylates, phthalates, such as diisobutyl, dioctyl, diphenylphthalate, benzylbutylphthalate, and carbonates, such as diphenylcarbonate and ethylphenyl carbonate.

Among the ethers, those containing from 2 to 20 carbon atoms are suitable such as diethylether, dibutylether, diisoamylether, dioctylether, dioxane, trioxane, tetrahydrofuran and hindered ethers, such as methyl-cumyl-ether.

Examples of other usable electron-donors are benzophenone, phosphites, such as triphenylphosphite, triphenylphosphines, benzoyl chloride, bromide and iodide, toluyl chloride, butyrolactone.

Silicon compounds can also be used if they contain at least one Si-OR bond where R is an alkyl, cycloalkyl or aryl radical containing 1-18 C atoms, and etherocyclic compounds containing at least one nitrogen atom such as 2,2,6,6-tetramethylpiperidine, and 2,6-diisopropyl-piperidine. Preferably the silicon compounds include at least one Si—OR bond where R is an alkyl radical with 1-8 C atoms and at least one SiR' bond where R' is a linear or branched alkyl having 1 to 18 carbon atoms, a cycloalkyl having 5-18 carbon atoms, an aryl with 6-18 carbon atoms, a nitrogen-containing heterocylic ring having 5-6 carbon atoms, optionally substituted with an alkyl having 1-2 carbon atoms, such as a piperidinyl or pyrrolidinyl radical, wherein the ring nitrogen is bonded to the silicon atom.

Examples of silicon compounds are: (ethyl)Si(OEt)$_3$, (phenyl)Si(OEt)$_3$, (propyl)Si(OEt)$_3$, (butyl)Si(OEt)$_3$, (isopropyl)Si(OEt)$_3$, (isobutyl)Si(OEt)$_3$, (sec-butyl)Si(OEt)$_3$, (tert-butyl)Si(OEt)$_3$, (tolyl)Si(OEt)$_3$, (cyclohexyl)Si(OEt)$_3$, (chlorophenyl)Si(OEt)$_3$, (chloroethyl)Si(OEt)$_3$, (trifluoropropyl)Si(OEt)$_3$, (neopentyl)Si(OEt)$_3$, (cyclohexyl)Si(OCH$_3$)$_3$, (decyl)Si(OCH$_3$)$_3$, (octyl)Si(OCH$_3$)$_3$, (phenyl)Si(OCH$_3$)$_3$, (tert-butyl)$_2$Si(OCH$_3$)$_2$, (cyclohexyl)$_2$Si(OCH$_3$)$_2$, (tolyl)$_2$Si(OCH$_3$)$_2$, (isopropyl)$_2$Si(OCH$_3$)$_2$, (cyclohexyl)CH$_3$Si(OCH$_3$)$_2$, (tert-butyl)CH$_3$Si(OCH$_3$)$_2$, (trifluoropropyl)CH$_3$Si(OCH$_3$)$_2$, (isopropyl)CH$_3$SiOCH$_3$)$_2$, (sec-butyl)CH$_3$Si(OCH$_3$)$_2$, n-butyl(CH$_3$)Si(OCH$_3$)$_2$, n-octyl(CH$_3$)Si(OCH$_3$)$_2$, phenyl(CH$_3$)Si(OCH$_3$)$_2$, (sec-butyl)$_2$Si(OCH$_3$)$_2$, (trifluoropropyl)$_2$Si(OCH$_3$)$_2$, (phenyl)ClSi(OCH$_3$)$_2$, (ethyl)Si(isoC$_3$H$_7$)$_3$, ClSi(OEt)$_3$, CH$_2$=CH-Si(OEt)$_3$, (phenyl)$_3$SiOCH$_3$, Si-(OCH$_3$)$_4$, (cyclopentyl)$_2$Si(OCH$_3$)$_2$, t-butyl(4-methylpiperdinyl)Si(OCH$_3$)$_2$ and CF$_3$CH$_2$CH$_2$(methyl)Si(OCH$_3$)$_2$.

The preferred titanium or vanadium compounds include TiCl$_4$, TiCl$_3$, titanium halogen alkoxides, VCl$_4$, VCl$_3$ and vanadium acetyl acetone.

When the catalyst component does not include a magnesium dihalide, the preferred method to support the titanium or vanadium compound is to impregnate the support with a solution of the titanium and vanadium compound and subsequently evaporate the solvent.

If the Ti or V compound is tetravalent, it is preferred to impregnate the support with a reducing agent solution, such as an MgR$_2$ or an Al-alkyl compound, evaporate the solvent and treat the solid thus obtained with a solution of the Ti or V compound. Compounds, such as TiCl$_3$, may be dissolved in alcohols. The alcohol is subsequently separated from the support by known methods such as reaction with TiCl$_4$.

The catalyst components of the invention form, upon reaction with Al-alkyl compounds, catalysts useful in the polymerization of olefins having the formula CH$_2$=CHR, where R is hydrogen, an alkyl radical with 1-6 C, or an aryl radical and mixtures of said olefins with or without dienes.

The Al-alkyl compounds are preferably Al-trialkyls, as for instance AlEt$_3$. Linear or cyclic alkyl compounds may also be used if they contain two or more Al atoms bonded to hetero-atoms, such as:

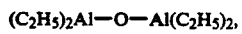

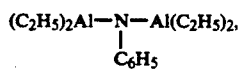

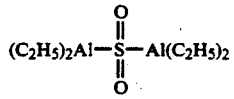

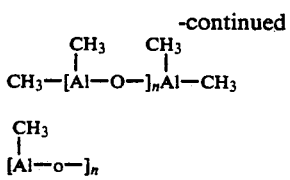

where n is a number from 1 to 20. AlR$_2$OR' compounds may also be used, where R' is an aryl radical substituted in position 2 and/or 6, and R is an alkyl radical containing from 1 to 8 carbon atoms.

The Al-trialkyl compounds may be used in a mixture with Al-alkyl halides, such as AlEt$_2$Cl.

The polymerization of olefins is conducted using known methods, operating in a liquid phase formed, eventually, by the monomer, or in gas phase, or by a combination of liquid and gas polymerization states. The polymerization temperature is usually from 0° to 150° C., usually between 60° and 90° C., and takes place at atmospheric pressure or higher pressure.

The catalysts may be precontacted with small quantities of the olefin monomer (prepolymerization), to improve performances and above all improve the morphology of the polymers obtained.

Such prepolymerization is carried out by maintaining the catalyst suspended in an organic solvent, the quantity of polymer that is produced in this copolymerization stage is preferably from 0.5 to 3 times the weight of the quantity of catalyst used.

When the catalyst is used in the stereoregular polymerization of olefins having the formula $CH_2=CHR$, where R is an alkyl radical with 1-6 C atoms or an aryl radical, it includes, in addition to an electron-donor compound supported on the solid component, an outside electron-donor compound, which is used in combination with an Al-alkyl compound. The outside donor is generally selected from those useful as internal donors.

These catalysts are particularly used in the stereoregular polymerization of propylene, or copolymerization of same with smaller proportions of ethylene or other olefins.

In the case of the stereoregular polymerization of propylene and generally of olefins having the formula $CH_2=CHR$, where R is an alkyl radical with 1-6 C atoms, the catalyst component used preferably includes as the internal donor, a compound selected from phthalic acid esters, such as hexyl or diisobutyl phthalates, and as outside donors, a silicon compound containing at least one SiOR and one SiR' bond as already indicated.

The polymers obtained using the catalysts of this invention have a spherical form with a diameter that can be made to range from 100 to 3000 μm, depending on the catalytic component and the polymerization conditions used.

The following examples illustrate the invention, and not limit the scope of same.

The values of porosity and surface area reported in examples and referred to in the specification are determined according to B.E.T. method.

EXAMPLE 1

A) Preparation of the Support Medium

Into a 2 liter reactor is introduced a suspending system formed by distilled water (450 ml), a suspending agent (ROAGIT S grade) in water solution at 5% brought to pH7 with NaOH (16.2 ml), a bleaching clay (PROLIT C10 grade) (2.25 gr) and NaCl (0.45 g).

The mixture is agitated at room temperature for 30 min., and then is introduced the monomer system prepared separately and consisting of 100 g styrene and 67.5 g of divinylbenzene (50% in ethylvinylbenzene), in toluene (225 ml) and n-octane (75 ml) containing 3 g benzoyl peroxide. The reaction mixture is polymerized, while being agitated at 400 rpm, for 10 hrs at 80° C.

The spherical polymer obtained is separated by centrifuge and repeatedly washed with water. It is then dried and extracted for 24 hrs in Kumagava with acetone, subsequently, after drying, for 24 hrs with ethanol and then, after further drying, with a heptane solution of AlEt$_3$ 1M.

It is then washed with heptane and vacuum dried.

The resulting copolymer has the form of microspheroidal particles with the following characteristics:
surface area = 552 M$^2$/g;
porosity 1.27 cc/g;
75% of the radius of the pore are from 150 to 350 Å.

B) Preparation of the Catalyst Component

Into a 1000 ml flask are introduced 4.3 g of the styrene-divinylbenzene resin prepared in A, a 35 ml heptane solution of the complex MgCl$_2$.2Ti(OC$_4$H$_9$)$_4$ (equal to 18 milligram-atoms of Mg). The ingredients are maintained in rotavapor agitation while heating to 70° C. for 4 hrs. At the end of this time a vacuum is created and the solvent removed. The solid obtained is suspended in 200 ml TiCl$_4$, containing 6 m moles of diisobutylphthalate (DIBP). In 30 minutes the temperature is brought to 100° C. and allowed to react at this temperature for 2 hrs. The TiC$_4$ is removed by filtration at the reaction temperature and an equal quantity is added and allowed to react at 100° C. for 2 hrs.

The solid is recovered by hot filtration (90° C.). It is then washed at 90° C. with n-heptane until no chloride ions remain in the wash. The solid is vacuum dried, and when analyzed gives the following composition by weight: Mg=5.16%; Ti=2.35%; Cl=20.9%; DIBP=7.8%.

EXAMPLE 2

Into a 1000 ml flask are introduced 4.5 g of the styrene-divinylbenzene copolymer of example 1, and 61 ml of ethanol solution of MgCl$_2$ at 5% by weight. This is agitated in a rotavapor while heating at 70° C. for 4 hrs, after which a vacuum is created removing part of the ethanol until a molar ratio of C$_2$H$_5$OH/Mg of 3 is obtained.

The solid is suspended in 200 ml of TiCl$_4$ containing 6 m Moles diisobutylphthalate (DIBP). Within 30 minutes the temperature is brought to 100° C. and the reaction continued at this temperature for 2 hrs. The TiCl$_4$ is removed by filtration at the reaction temperature and an equal part of TiCl$_4$ is added, allowed to react at 100° C. for 2 hrs.

The reaction mixture is filtered at 90° C. and the solid is washed with n-heptane until no chloride ions remain in the wash.

The solid is vacuum dried, and when analyzed gives the following composition by weight: Mg=3.72%; Ti=2.18%; Cl=8.3%; DIBP=2.8%.

EXAMPLE 3

Into a 1000 flask are introduced 3 g of styrene/ divinylbenzene resin of example 1, and 75 ml of a 0.2 M heptane solution of Mg(hexyl)$_2$.

This is agitated for 4 hrs at 70° C., after which the solvent is removed under a vacuum. To the solid thus obtained is added 100 ml SiCl$_4$ and the ingredients are refluxed for 5 hrs, filtered, and the solid washed with n-heptane and suspended in 200 ml TiCl$_4$ containing 1.2 mM diisobutylphthalate. The temperature is brought to 100° C. and the reaction is continued for 2 hrs. At the end of this time the TiCl$_4$ is removed by filtration at 100° C. and an equal quantity of TiCl$_4$ is added and allowed to react for 2 hrs at 100° C.

The reaction mixture is then filtered at 100° C. and the solid is washed with n-heptane at 90° C. until all chloride ions are removed. Upon analysis the solid gives the following composition by weight: Ti=2.76%; Mg=3.54%; Cl=18.7%; DIBP=17.9%.

EXAMPLE 4

Into a 1000 ml flask are introduced 3 g styrenedivinylbenzene resin of example 1, and 30 ml 0.5M hexane solution of Mg(n-hexyl)$_2$. These ingredients are agitated for 4 hrs at 50° C., and the solvent is removed under vacuum. To the solid thus obtained is added 30 ml of 1.5 M of AlEt$_2$Cl solution. It is allowed to react for 4 hrs at 25° C., and filtered. The solid is washed with n-heptane and suspended in 200 ml of TiCl$_4$ containing 1.2 mM of diisobutylphthalate. The temperature is raised to 100° C. and left to react for 2 hrs.

At the end of this time the TiCl$_4$ is removed by filtration at 90° C. and an equal quantity of TiCl$_4$ is added and allowed to react at 100° C. for 2 hrs.

The reaction mixture is filtered and the solid is washed with n-heptane at 90° C. until all chloride ions are removed.

Upon analysis, the solid gives a content of: Ti=2.4%; Mg=3.87%; Cl=16.8% and DIBP=14% by weight.

Propylene Polymerization

Into a 2 liter stainless steel autoclave is introduced at 50° C., under a propylene flow, a suitable quantity of the catalyst component, prepared according to examples 1–4 and suspended in 700 ml n-heptane containing 3.5 mM Al(C$_2$H$_5$)$_3$ and 0.175 mM phenyltriethoxysilane. The autoclave is then closed, a pressure of 0.1 atm of H$_2$ is introduced, the total pressure is brought up to 7 atm, and the temperature to 70° C. The polymerization is continued for 2 hrs while the Propylene monomer is continuously fed into the autoclave.

Prepolymerization

Into a 100 ml flask is suspended 1 g of the catalyst component prepared respectively according to examples 1 and 2 in 15 ml n-heptane; Al(C$_2$H$_5$)$_3$ and phenyltriethoxysilane are added in the following ratio with respect to the titanium contained in the solid:

Al/Ti=10; Al/Si=5.

While agitating at 20° C. 1.2 g of gaseous propylene is added at 15 min. The suspension thus obtained is transferred to the autoclave under a propylene flow and propylene is polymerized in the manner as set forth above. The results are shown in the table below.

TABLE

| CATALYST COMPONENT | | POLYMERIZATION | | | | |
|---|---|---|---|---|---|---|
| | | Yield g polymer/ g catalyst component | Total isotacticity index-II % | $\eta$ (dl/g) | Bulk density (tamped) (g/cc) | Flowability sec. |
| Ex. No. | mg | Prepolymerization | | | | |
| 1 | 21 | | 1,840 | 95.3 | 1.20 | 0.40 | 18 |
| 1 | 18 | + | 3,700 | 96.9 | 1.20 | 0.41 | 17 |
| 2 | 22 | | 1,400 | 93.0 | 1.1 | 0.33 | 21 |
| 2 | 19 | + | 2,850 | 95.0 | 1.1 | 0.41 | 19 |
| 3 | 24 | | 1,500 | 91.8 | 1.0 | 0.39 | 20 |
| 4 | 25 | | 1,100 | 92.0 | 1.1 | 0.38 | 21 |

EXAMPLE 5

Into a 1000 ml flask are introduced 3.2 g of the resin of example 2, and 30 ml MgCl$_2$.2Ti(OC$_4$H$_9$)$_4$ (equal to 13.3 milligram-atoms of Mg) in a heptane solution. The ingredients are agitated in rotavapor at 70° C. for 4 hrs. After this time, the solvent removed under vacuum.

The solid obtained is treated with 29 ml of polymethylhydrosiloxane (PMHS) equal to 43.2 milligram-atoms of H, in 20 ml n-heptane and 4.9 ml SiCl$_4$ for 2 hours at 60° C.

The solid is isolated by filtration and washed with n-heptane. The vacuum dried solid shows a titanium content of 8.27% by weight.

EXAMPLE 6

Into a stainless steel autoclave with a capacity of 2.5 liters, are introduced at 45° C., in a hydrogen flow, 1000 ml anhydrous hexane, 1.5 g Al(iC$_4$H$_9$)$_3$ and 20 mmg of the catalyst component of example 5.

The autoclave is closed and the temperature brought to 85° C. It is then pressurized with hydrogen up to 4.7 atm, and then with ethylene up to a total of 11 atm—(-partial ethylene pressure 6.3 atm).

The reaction mixture is polymerized for 3 hrs while continuously feeding ethylene, maintaining constant temperature and pressure.

When the reaction is complete, the polymer is recovered by filtration and dried in furnace at 60° C. for 8 hrs under a flow of nitrogen.

160 g polyethylene are obtained which have the following characteristics:

Melt index E=2.56 (g/10');
Melt index F=70.5 (g/10');
Bulk density (poured)=0.250 (kg/1);
Bulk density (tamped)=0.308 (kg/1).
Melt indexes E and F are determined according to ASTM D 1238 conditions E and F respectively.

EXAMPLE 7

Polymerization of propylene is repeated using the catalyst component of example 1 as set forth in the table below.

The catalyst components have the following properties:

| Resin | Surface area m²/g | Porosity cc/g | Pore radius from 150 to 350 Å % |
|---|---|---|---|
| A | 60 | 0.3 | 35 |
| B | 80 | 0.45 | 40 |
| C | 450 | 0.7 | 50 |

The following polymerization results are obtained:

| Resin | Yield g PP/g cat. comp. | Isotacticity Index % | Bulk density (tamped) g/cc |
|---|---|---|---|
| A | 1000 | 92 | 0.38 |
| B | 1300 | 94 | 0.40 |
| C | 1500 | 95 | 0.41 |

EXAMPLE 8

A) PREPARATION OF THE CATALYST COMPONENT 2.66 g Ti $(OC_4H_9)_4$ are reacted with 0.33 g $MgCl_2$ at 135° C. for 6 hrs. The product of the reaction is cooled to room temperature and diluted with 5 ml n-heptane and xylene mixture containing 4% xylene by volume. The mixture is then added dropwise over 60 minutes from a 15 ml addition funnel, with the thermostat at 50° C., into a 200 ml reactor charged with 20 g styrene-divinylbenzene resin having the following characteristics:

surface area = 80 m²/g, porosity = 0.4 cc/g.

During the dropwise addition, the resin is kept under gentle agitation. It is then cooled to 0° C. and 3.5 g of a complex $MgCl_2.6AlEtCl_2$ diluted in a 1/1 mixture of heptane and xylene. The mixture is kept under agitation for 60 minutes. The temperature is then raised to 60° C. and the mixture is agitated for 2 hrs. The mixture is then cooled to room temperature and the solid is washed 6 times with 60 ml aliquots of anhydrous hexane each time.

The solution then dried under reduced pressure at 60° C. 24 g of a microspheriodal flowing particulate product is obtained.

B) Copoylmerization of Ethylene and Propylene.

Into a 1.5 liter autoclave with a magnetic agitator, 1000 ml propylene are introduced, after de-aeration and clearing of the autoclave with propylene. The temperature is brought to 20° C. It is then saturated with ethylene up to 12.5 atm, and the catalyst complex, (0.1833 g of the catalyst component of example 1 A) and 1.58 g Al-triisobutyl in 10 ml hexane, which was prepared separately, and premixed for 5 minutes, is introduced with propylene gas pressure.

The mixture is polymerized for 1 hr, with continuous feeding ethylene while maintaining a constant pressure of 12.5 atm.; the reaction is the interrupted by injecting into the autoclave 20 ml acetone.

The residual monomer are evaporated while agitating.

The copolymer is dried at 60° C. under a nitrogen flow. 165 g of compact spheroidal particles polymers are obtained.

The yield is of 150,000 g/g Ti. The propylene content is 38.1% by weight. The crystallinity (polyethylene type) is 3%.

The properties of the polymers produced with the catalyst of this invention after crosslinking, are in line with those of the copolymers obtained with traditional catalysts obtained from with a vanadium compounds and Al-Alkyl halides.

Other features, advantages and embodiments of the invention disclosed herein will be readily apparent to those exercising ordinary skill after reading the foregoing disclosures. In this regard, while specific embodiments of the invention have been described in considerable detail, variations and modifications of those embodiments can be effected without departing from the spirit and scope of the invention as described and claimed.

We claim:

1. A catalyst component for the polymerization of olefins comprising a titanium or vanadium compound and magnesium dihalide in active form, supported on a porous polymeric support consisting essentially of a copolymer obtained by the copolymerization of 70 to 30 weight % styrene monomer selected from the group consisting of styrene, ethylvinylbenzene, vinyltoluene and methylstyrene and 30 to 70 weight % of a crosslinkable monomer selected from the group consisting of divinylbenzene, divinyltoluene and mixtures thereof, wherein the porosity of the component is greater than 0.2 cc/g and the pore distribution is such that at least 30% of the pores have radius greater than 150 Å.

2. The catalyst component of claim 1 wherein the titanium or vanadium compound contains at least one Ti-halogen or V-halogen bond.

3. The catalyst component of claim 2 having an X-ray spectrum where the most intense diffraction line of the magnesium dihalide is substituted by a halo having the maximum intensity shifted with respect to the position of the most intense diffraction line.

4. The catalyst component of claim 3 where the titanium or vanadium compound and magnesium dihalide are present in quantities, expressed as metal Ti, V and Mg, respectively, from 1 to 10% by weight.

5. The catalyst component of claim 3 further comprising an electron-donor compound.

6. The catalyst component of claim 5 wherein the electron-donor compound is selected from the group consisting of alkyl, aryl or cycloalkyl esters of mono and dicarboxylic aromatic acids.

7. The catalyst component of claim 6 wherein the ester is a phthalic acid ester.

8. The catalyst component of claim 5 wherein the electron-donor compound is 2,2,6,6-tetramethylpiperidine.

9. The catalyst component of claim 5 wherein the electron-donor compound is a silicon compound containing at least one Si—OR bond where R is an alkyl radical with 1-8 carbon atoms and at least one SiR' bond where R' is a linear or branched alkyl radical with 1-18 carbon atoms, a cycloalkyl having 5-18 carbon atoms, an aryl with 6-18 carbon atoms or a nitrogen-containing heterocylic ring having 5-6 carbon atoms, wherein the ring nitrogen is bonded to the silicon.

10. The catalyst component of claim 1 having a porosity from 1 to 2 cc/g and a pore distribution such that at least 40% of the pores have a radius from 150 to 350 Å.

11. A catalyst for the polymerization of olefins comprising the product obtained by reacting the catalyst component of claim 1 and an Al-alkyl compound.

12. The catalyst component of claim 1 wherein the porous support is a partially cross-linked styrenedivinylbenzene copolymer, containing 40 to 60% divinylbenzene.

13. A process for the preparation of a catalyst component comprising suspending a polymeric support consisting essentially of a copolymer obtained by the copolymerization of 70 to 30 weight % of a styrene monomer selected from the group consisting of styrene, ethylvinylbenzene, vinyltoluene and methylstyrene and 30 to 70 weight % of a crosslinkable monomer selected from the group consisting of divinylbenzene, divinyltoluene and mixtures thereof, in the form of microspherodical particles having a porosity greater than 0.3 cc/g and a pore size distribution such that at least 40% of the particles have a radius greater than 150 Å, in a solution of magnesium dihalide or a magnesium compound capable of being transformed into a magnesium dihalide by reaction with halogenating agents, removing the solvent by evaporation and reacting the solid obtained with titanium or vanadium compounds.

14. The process of claim 13 wherein the magnesium compound solution contains a $MgCl_2.2Ti(OC_4H_9)_4$ compound or a magnesium dichloride solution in an alcohol, and the solid obtained after the evaporation of the solvent is then reacted with $TiCl_4$.

15. A catalyst for the polymerization of olefins comprising the product of the reaction of a component of claim 2 with an Al-alkyl compound.

16. A catalyst for the polymerization of olefins comprising the product of the reaction of a catalyst component of claim 2 comprising a titanium halide and an electron-donor compound with an Al-trialkyl compound.

17. The catalyst of claim 16 wherein an electron-donor compound is used together with the Al-trialkyl compound.

18. The catalyst of claim 17 wherein the electron-donor compound is a silane comprising at least one Si—OR bond where R is an alkyl radical with 1–8 C atoms and at least one SiR' bond where R' is a linear or branched alkyl radical with 1–18 carbon atoms, a cycloalkyl having 5–18 carbon atoms, an aryl with 6–18 carbon atoms or a nitrogen-containing heterocylic ring having 5–6 carbon atoms, wherein the ring nitrogen is bonded to the silicon.

* * * * *